US006968207B1

(12) United States Patent
Ezumi et al.

(10) Patent No.: US 6,968,207 B1
(45) Date of Patent: Nov. 22, 2005

(54) COMMUNICATION SYSTEM CAPABLE OF SPEECH AND FACSIMILE COMMUNICATION

(75) Inventors: Yosuke Ezumi, Kita Soma-gun (JP); Takehiro Yoshida, Tokyo (JP); Junji Iguchi, Abiko (JP); Shunichi Fujise, Abiko (JP); Yasuyuki Nakamura, Yokohama (JP); Naoya Watanabe, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 09/694,037

(22) Filed: Oct. 23, 2000

(30) Foreign Application Priority Data

Oct. 25, 1999 (JP) ................................ 11-302307

(51) Int. Cl.[7] ................................................ H04B 1/38

(52) U.S. Cl. .................. 455/557; 455/555; 455/556.1; 358/468; 358/476; 379/100.12; 379/428.04

(58) Field of Search ................................ 455/558, 556, 455/550, 575, 66, 76, 84, 344, 557, 462, 455/436, 555, 556.1, 575.1, 550.1, 66.1, 455/345, 347, 424, 425, 426.1, 426.2, 456.5, 455/456.6, 553.1, 554.1, 554.2, 561, 569.1, 455/569.2, 100; 379/100.01, 67.1, 100.12, 379/428.04, 431, 433.05, 437.06, 96, 98, 379/93, 59, 58; 358/400, 472, 442, 438, 439, 358/444, 434, 436, 426.09, 468, 476, 405, 358/426, 296, 500; 755/557; 370/286, 289, 370/290, 291, 252, 249, 276

(56) References Cited

U.S. PATENT DOCUMENTS

| | | | | | |
|---|---|---|---|---|---|
| 5,148,470 | A | * | 9/1992 | Kobayashi et al. | 379/58 |
| 5,200,991 | A | * | 4/1993 | Motoyanagi | 455/465 |
| 5,255,312 | A | * | 10/1993 | Koshiishi | 379/100 |
| 5,452,474 | A | * | 9/1995 | Kagawa | 455/89 |
| 5,526,405 | A | | 6/1996 | Toda | 379/61 |
| 5,528,666 | A | | 6/1996 | Weigand et al. | 379/58 |
| 5,590,414 | A | | 12/1996 | Marui et al. | 455/89 |
| 5,608,545 | A | * | 3/1997 | Kagawa | 358/468 |
| 6,026,308 | A | * | 2/2000 | Hsieh | 455/557 |
| 6,128,510 | A | * | 10/2000 | Beukema et al. | 455/557 |
| 6,185,195 | B1 | * | 2/2001 | Leung | 370/286 |
| 6,297,893 | B1 | * | 10/2001 | Menaldo Moretta et al. | 358/498 |

FOREIGN PATENT DOCUMENTS

| | | |
|---|---|---|
| EP | 0 865 186 | 9/1998 |
| FR | 2 762 739 | 10/1998 |
| WO | 98/11760 | 3/1998 |
| WO | 98/47300 | 10/1998 |
| WO | 99/49682 | 9/1999 |

* cited by examiner

*Primary Examiner*—Nguyen T. Vo
*Assistant Examiner*—Charles Chow
(74) *Attorney, Agent, or Firm*—Fitzpatrick, Cella, Harper & Scinto

(57) ABSTRACT

In a communication system having a first communication apparatus capable of a first communication via a first communication line such as a wire line and a second communication apparatus capable of a second communication via a second communication line such as a wireless line, information input from an information input unit of the first communication apparatus is transmitted over the second communication line via the second communication apparatus.

8 Claims, 5 Drawing Sheets

COMMUNICATION SYSTEM CAPABLE OF SPEECH AND FACSIMILE COMMUNICATION

BACKGROUND OF THE INVENTION

1. Field of the Invention

The present invention relates to a communication system having a first communication apparatus capable of communication via a first communication line and a second communication apparatus capable of communication via a second communication line, and to communication apparatus used for the system.

2. Related Background Art

Wireless portable telephones and personal handy-phone system (PHS) telephones are greatly prevailing nowadays, and some people have telephones more than one. A user can hold a wireless telephone in hand and can make a telephone conversation anywhere and anytime. It is a great convenience for a user to have such a telephone.

Many telephones have no hands-free function for hands-free talking. Even if a wireless portable telephone or PHS telephone is provided with the hands-free function, the sound quality is not good because a small speaker and a small microphone built in the telephone are used.

The distribution of facsimile apparatus, which are typical communication apparatus connectable to a public telephone line, is very high. The future use of a facsimile apparatus is considered not to be lowered, because an original image or text can be easily transmitted or received.

Household telephones are being increasingly replaced by facsimile apparatus which are provided with a hands-free talking function and an automatic answering telephone. Acoustic components used with a facsimile apparatus having the hands-free talking function have good characteristics. A dedicated echo canceler is also built in a facsimile apparatus.

A wireless portable telephone or PHS telephone used via a cell system base station is required to be compact and light in weight so as to facilitate to hold it outdoors.

It cannot always be said that a compact and light telephone is easy to use. Namely, a compact telephone uses a compact speaker so that the sound volume is small and the sound quality is poor, and the sensitivity of the microphone is low. Therefore, it is necessary to use the microphone and speaker set near at a user, and the so-called hands-free talking is difficult.

In addition, a small telephone has a small battery in order to reduce the weight of the telephone. If a large sound is reproduced or an echo canceler is driven for the hands-free talking, a large current flows and the battery is consumed greatly. A speech time or a standby time may be shortened. Such a telephone is not therefore suitable for indoor use.

SUMMARY OF THE INVENTION

It is an object of the invention to provide communications of good quality by using communication apparatus capable of communication via different communication lines.

It is another object of the present invention to provide an easy-to-use communication system having a first communication apparatus capable of communication via a first communication line and a second communication apparatus capable of communication via a second communication line.

It is another object of the present invention to make a communication apparatus capable of communication by itself be usable as a communication adapter for another communication apparatus.

Other objects and features of the present invention will become apparent from the following detailed description of embodiments when read in conjunction with the accompanying drawings.

DETAILED DESCRIPTION OF THE PREFERRED EMBODIMENTS

In the following, the description will be given for the embodiments of the invention including a wireless telephone apparatus, a communication apparatus, a wireless talking method, and a storage medium. In the embodiments, the wireless telephone apparatus is applied to a PHS (Personal Handy-phone System) telephone in Japan and the communication apparatus is applied to a facsimile apparatus.

Figure 1A:
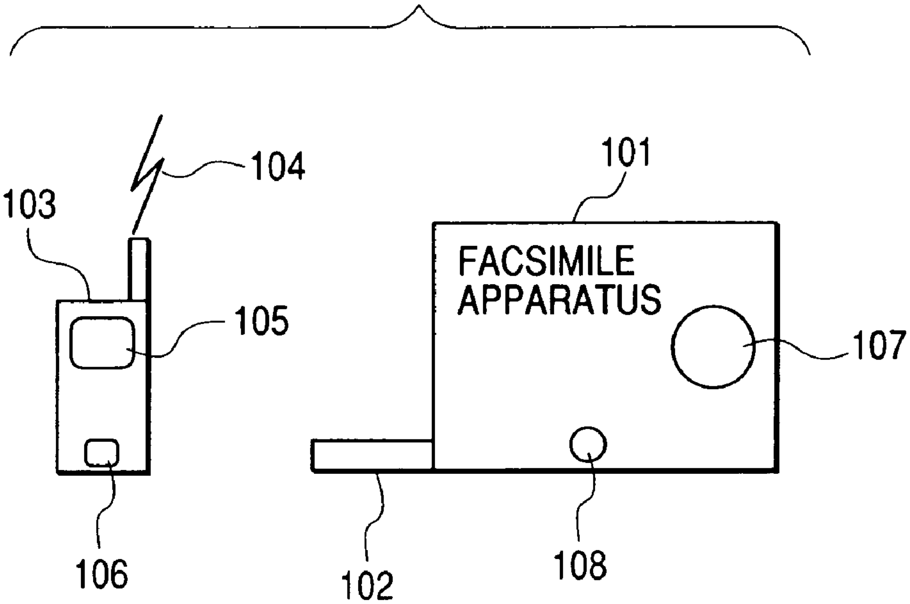
FIGS. 1A and 1B are schematic diagrams showing the structures of a wireless telephone apparatus and a facsimile apparatus according to an embodiment of the invention.
Figure 1B:
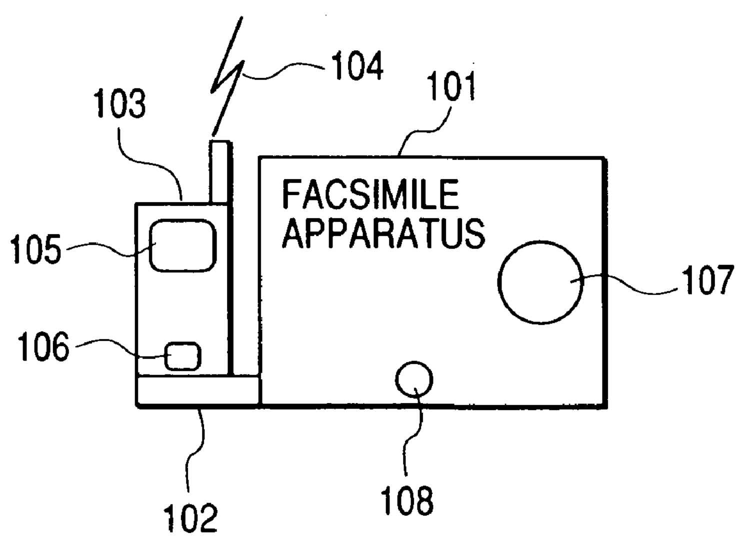

FIGS. 1A and 1B are schematic diagrams showing the structures of a wireless telephone apparatus and a facsimile apparatus according to the embodiment of the invention. The facsimile apparatus 101 has a connection unit 102 for the connection to the wireless telephone apparatus 103. This connection unit 102 may be built in the facsimile apparatus 101 or detachably mounted on the facsimile apparatus 101. The facsimile apparatus 101 is connectable to a radio channel (wireless line) via the wireless telephone apparatus 103 or to a wire channel such as a PSTN channel and an ISDN channel. The wireless telephone apparatus 103 has a connection unit (corresponding to a connector 213 shown in FIG. 2).

FIG. 1A shows the state that the wireless telephone apparatus 103 is not connected to the facsimile apparatus 101. This state corresponds to the state that the wireless telephone apparatus 103 is connected to a radio channel 104 and can have a telephone conversation over the radio channel 104. In this case, a speaker 105 and a microphone 106 built in the wireless telephone apparatus 103 are used for the telephone conversation.

FIG. 1B shows the state that the wireless telephone apparatus 103 is connected to the facsimile apparatus 101. This state corresponds to that the wireless telephone apparatus 103 functions as a wireless adapter and that the facsimile apparatus is connected to a radio channel 104 via the wireless telephone apparatus 103 and can have a telephone conversation. In this case, a speaker 107 and a microphone 108 built in the facsimile apparatus 101 are used for the telephone conversation.

In this embodiment, the radio system is PHS. Other similar radio systems may also be used. For example, general wireless radio systems currently used, such as a PDC system and a CDMA system including IMT 2000, may be used. Future radio systems to be developed may also be used. A DECT (Digital European Cordless Telephone) system or a GSM (Global System for Mobile Communications) system developed in Europe may also be used.

Figure 2:
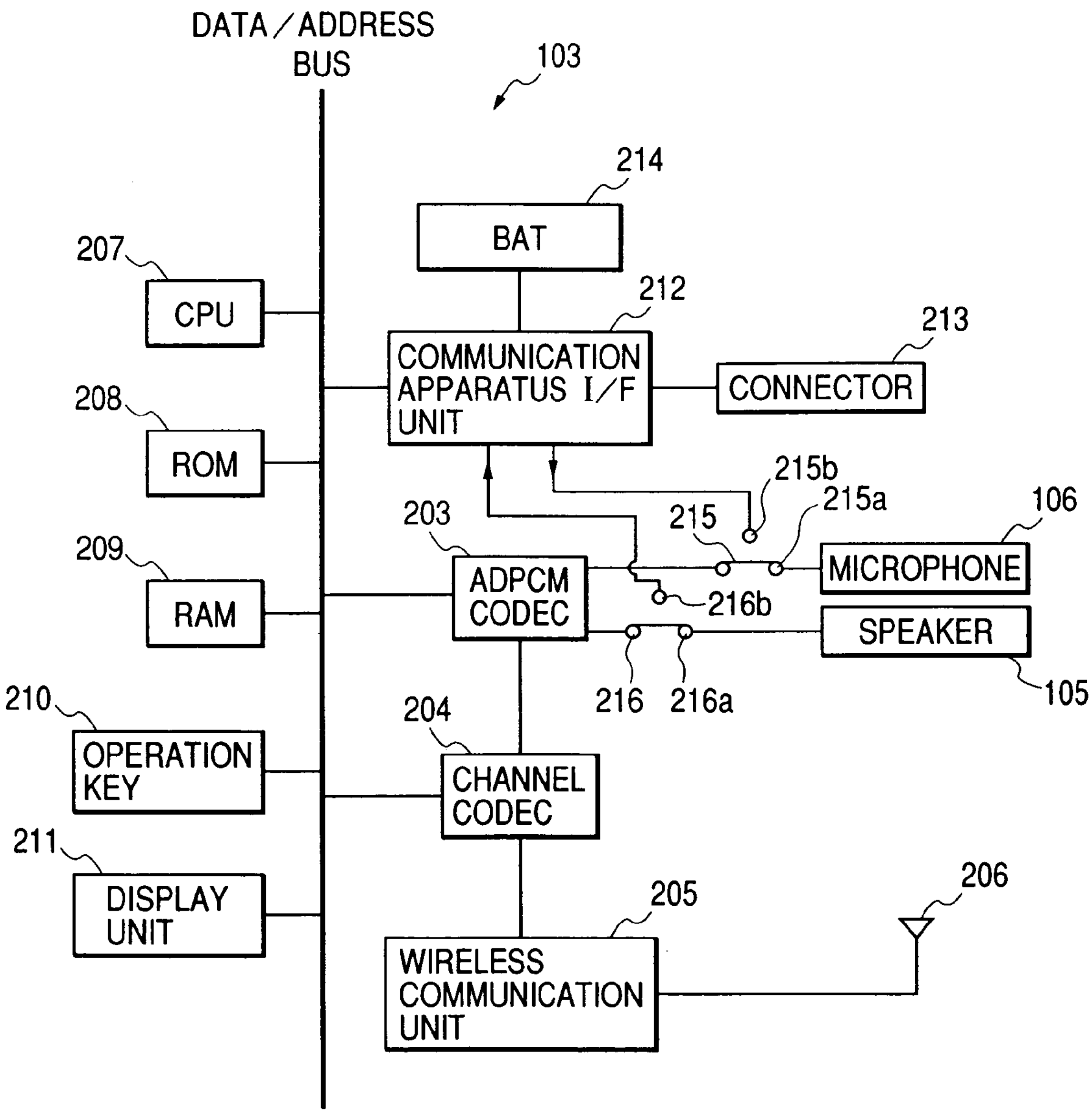
FIG. 2 is a block diagram showing the structure of the wireless telephone apparatus 103 shown in FIG. 1.

FIG. 2 is a block diagram showing the structure of the wireless telephone apparatus 103. The wireless telephone apparatus 103 has a microphone 106, a speaker 105, an ADPCM codec 203, a channel codec 204, a wireless communication unit 205, key switches (operation keys) 210, a display unit 211, a CPU 207, a ROM 208, a RAM 209, a communication apparatus I/F unit 212, a connector 213, and a battery BAT 214.

The microphone 106 receives sounds and outputs a sound signal. The ADPCM codec 203 converts a sound signal input from the microphone 106 into an ADPCM code to transmit it over the radio channel, and converts a received ADPCM code into an analog voice signal to output it from the speaker 105. The channel codec 204 converts voice data and control data into data in conformity with a PHS communication system, and derives audio data from received data.

The radio communication unit 205 has the antenna 206 and various electronic components, the antenna 206 being used for the connection to the radio channel 104 of a base station provided by a radio common carrier. The operation keys 210 have a plurality of key switches to be used for instructing each operation. The display unit 211 may be an LCD or an LED to be used for a user to confirm the state of the wireless telephone apparatus 103 or display other data.

CPU 207 controls the whole of the wireless telephone apparatus (a child apparatus). ROM 208 stores programs and parameters to be used for controlling the whole of the wireless telephone apparatus, the programs being executed by CPU 207. RAM 209 temporarily stores parameters to be used for controlling the whole of the wireless telephone apparatus, and transmission/reception data. The battery (BAT) 214 is connected to the facsimile apparatus or communication apparatus to charge the battery, and used as the power source of the wireless telephone apparatus 103.

The communication apparatus I/F unit 212 has a circuit for detecting whether the wireless telephone apparatus 103 is connected to the facsimile apparatus 101 and a control circuit for switching an output of an audio signal to the facsimile apparatus 101. The connector 213 establishes a physical connection (electrical connection) to the facsimile apparatus 101. Signal lines connected via the connector 213 include upstream and downstream audio signal lines, power source lines for charging the battery 214, and other lines.

The switch 215 switches an audio signal input to the ADPCM codec 203 between the microphone 106 and connector 213 to transmit it via the radio channel. The switch 216 switches an output of an audio ADPCM code received via the radio channel between the speaker 105 and connector 213.

Figure 3:
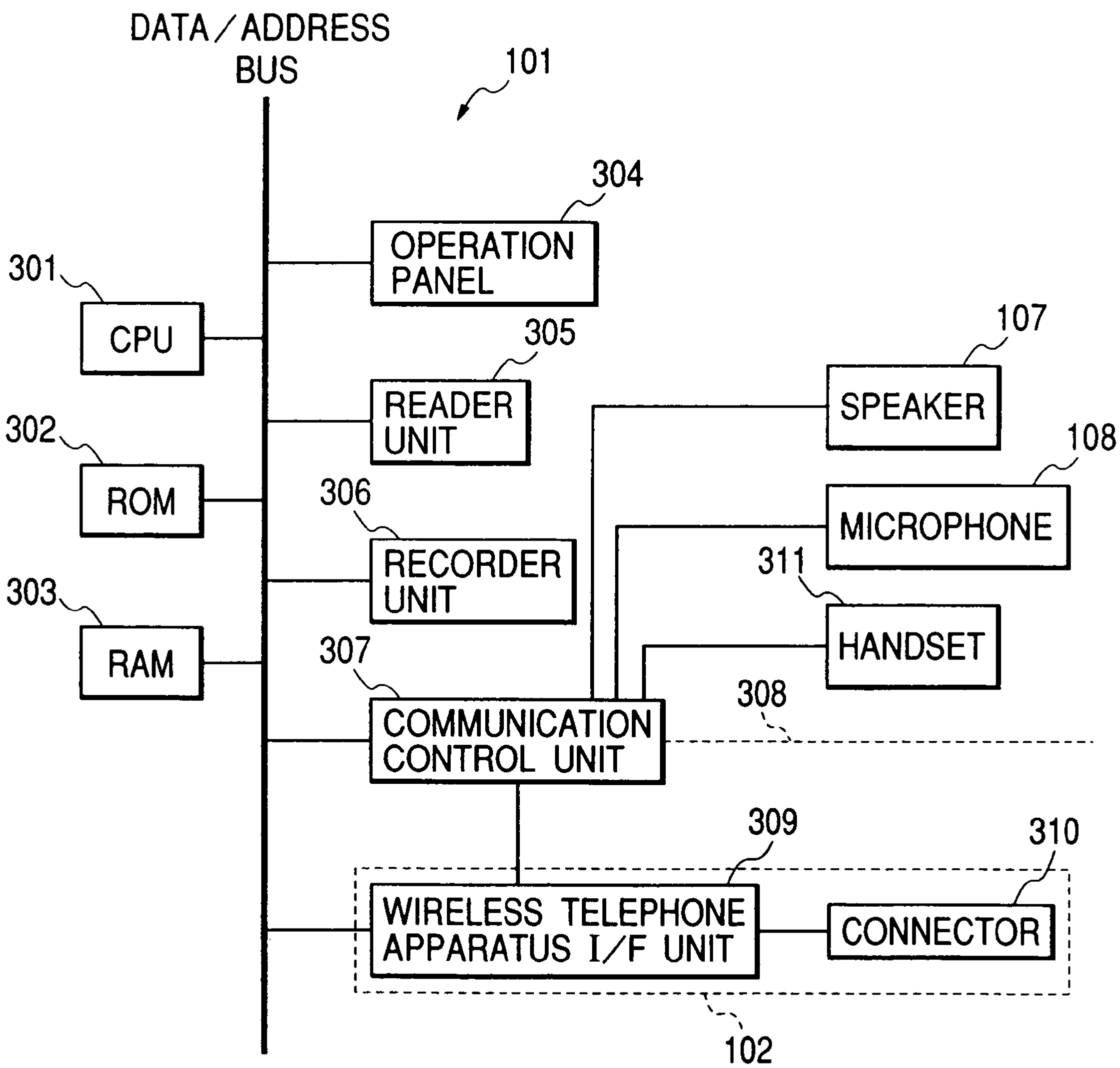
FIG. 3 is a block diagram showing the structure of the facsimile apparatus 101 shown in FIG. 1.

FIG. 3 is a block diagram showing the structure of the facsimile apparatus 101. The facsimile apparatus 101 is designed so that it can be connected to the wireless telephone apparatus 103.

The facsimile apparatus 101 has a CPU 301, a ROM 302, an operation panel 304, a reader unit 305, a recorder unit 306, a communication control unit 307, a microphone 108, a speaker 107, a handset 311, and a connection unit 102.

CPU 301 controls the whole of the facsimile apparatus 101. ROM 302 stores control programs and parameters to be executed by CPU 301 and used for controlling the whole of the facsimile apparatus. RAM 303 stores parameters and data necessary for the operations of CPU 301 and facsimile apparatus 101, image data and data files to be transmitted and received, data of a character code format, and the like.

The operation panel 304 is used for a user to instruct each operation of the facsimile apparatus 101 and is used for displaying the state of the facsimile apparatus 101. The reader unit 305 reads a facsimile transmission original or a copy original as a color image or a black/white image. The recorder unit 306 prints out a facsimile reception original or a copy original in color or black/white.

The communication control unit 307 performs a control and transmission/reception of a facsimile communication protocol such as G3 and G4, a control of signal modulation/demodulation, a control of a line echo canceler and an acoustic echo canceler for hands-free talking, an off-hook control and an on-hook detection for a public telephone apparatus line 308 such as PSTN and ISDN, and the like. In this embodiment, the communication control unit 307 also has a function of switching analog upstream and downstream signals transferred via the connection unit 102 between the microphone 108 and speaker 107 of the facsimile apparatus, and supplying a signal transferred via the public telephone apparatus line 308 to the handset 311 during a normal talking mode or switching the signal between the microphone 108 and speaker 107 of the facsimile apparatus during a hands-free talking mode.

The connection unit 102 has a wireless telephone apparatus I/F unit 309 and a connector 310. The wireless telephone apparatus I/F unit 309 is used for the interface with the wireless telephone apparatus 103 and has an audio signal connection circuit for receiving an audio signal from the wireless telephone apparatus 103, a power supply circuit for charging the battery BAT of the wireless telephone apparatus 103, and a circuit for detecting a connection of the wireless telephone apparatus 103. The connector 310 is physically (electrically) connected to the connector 213 of the wireless telephone apparatus 103. Signal lines connected via the connector 310 include upstream and downstream audio signal lines and power source lines for charging the battery of the wireless telephone apparatus 103.

Input/output lines of the wireless telephone apparatus I/F unit 309 are connected by the communication control unit 307 to the line echo canceler and acoustic echo canceler for the hands-free talking mode, in order to receive radio waves of audio signals transmitted from the wireless telephone apparatus 103.

Next, the connection units of the wireless telephone apparatus 103 and facsimile apparatus 101 will be described. The connector 213 connected to the communication apparatus I/F unit 212 of the wireless telephone apparatus 103 and the connector 310 connected to the wireless telephone apparatus I/F unit 309 of the facsimile apparatus 101 can be removably connected together. The signal lines connected via these connectors 213 and 310 include, as described earlier, the upstream and downstream audio signal lines used for talking via the radio channel 104, power source lines for charging the battery BAT 214 of the wireless telephone apparatus 103, and a signal line used for a detection signal notifying that the wireless telephone apparatus 103 is detected to the facsimile apparatus 101.

Digital signals such as a command signal, a response signal and a status signal are exchanged in some cases between the wireless telephone apparatus 103 and facsimile apparatus 101. Such digital signals may be exchanged by a general I/F unit such as a serial I/F unit.

Whether there is an electrical connection between the wireless telephone apparatus 103 and facsimile apparatus 101 can be confirmed: by detecting a current flowing through the connectors 213 and 310; or in addition to a detection of the current flowing through the connectors, by a presence/absence of a signal through the digital I/F unit or by a presence/absence of an audio signal during the hands-free talking mode. This electrical connection may also be confirmed, on the side of the wireless telephone apparatus 103 by a presence/absence of a charge voltage between the power source lines from the facsimile apparatus 101, and on the side of the facsimile apparatus 101 by a detection of the charge current with electronic components including a photocoupler. The electrical connection may also be confirmed by on/off of mechanical switches provided to both the wireless telephone apparatus 103 and facsimile apparatus 101.

Figure 4:
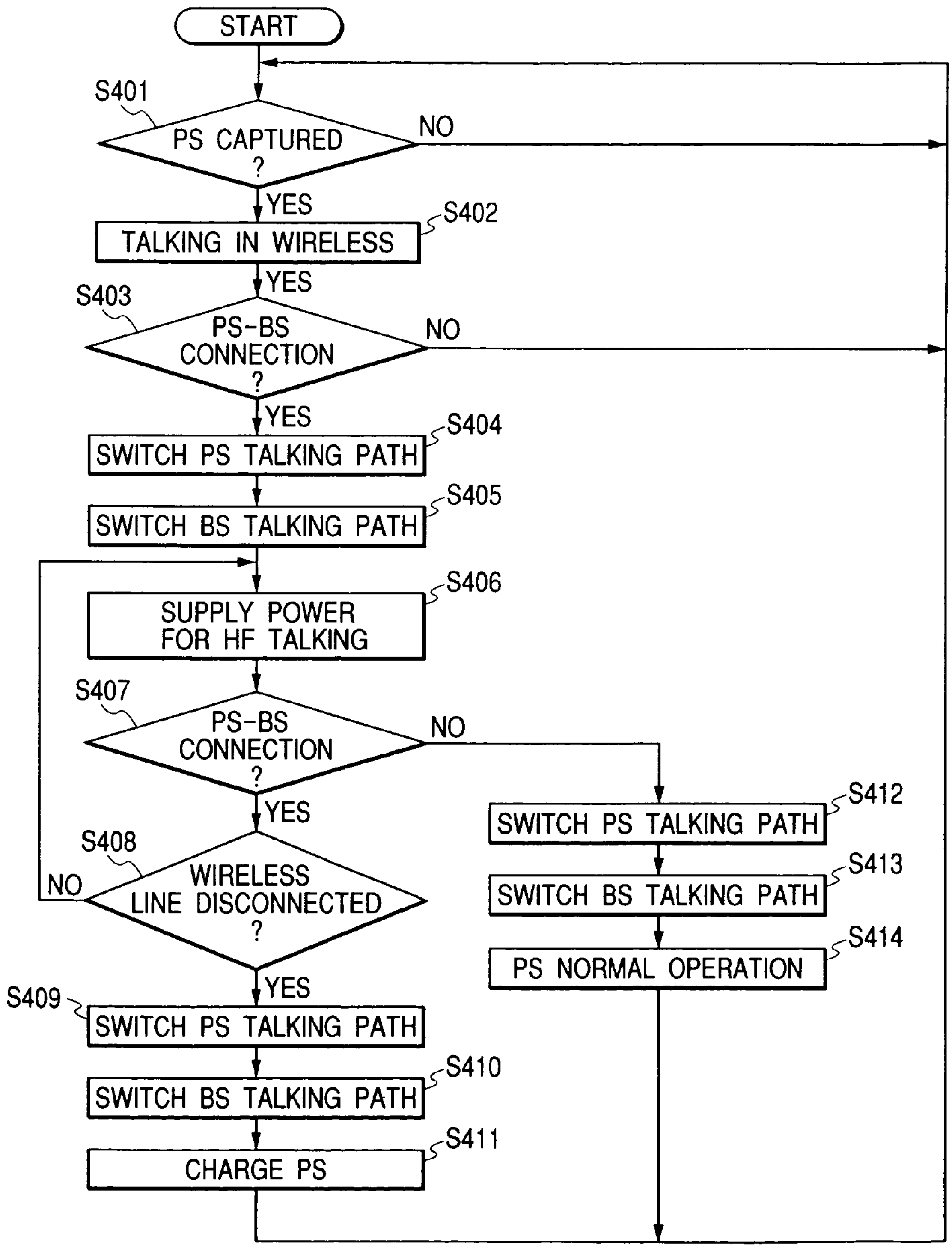
FIG. 4 is a flow chart illustrating the operation of a hands-free talking process.

Next, the operations of the wireless telephone apparatus 103 and facsimile apparatus 101 constructed as above will be described. FIG. 4 is a flow chart illustrating the hands-free talking process. A program realizing each step shown in this flow chart is stored in ROM 208 of the wireless telephone apparatus 103 and ROM 302 of the facsimile apparatus 101 and executed by CPU 207 and CPU 301.

When a connection operation of the wireless telephone (PS) 103 to a radio channel is executed, it is checked whether the radio channel is established (whether PS is captured) (Step S401). When the radio channel is established, the wireless telephone apparatus enters a talking state in which a usual talking is performed via the radio channel 104 by the wireless telephone apparatus 103 itself (Step S402). If the connection operation by the wireless telephone apparatus 103 is not executed, the wireless telephone apparatus 103 remains in a standby state.

The wireless telephone apparatus (PS) 103 and facsimile apparatus (BS) 101 check whether they are connected together (Step S403). In this embodiment, although a connection between the wireless telephone apparatus and facsimile apparatus is checked after the start of wireless talking at Step S402, it may be checked before the start of wireless talking.

If the wireless telephone apparatus 103 is not connected to the facsimile apparatus 101, Steps S401 and S402 are repeated and the wireless telephone apparatus 103 executes by itself usual talking via the radio channel 104.

If the wireless telephone apparatus 103 is connected to the facsimile apparatus 101, talking paths of the wireless telephone apparatus (PS) 103 are switched (Step S404). Specifically, in order to transmit an audio signal from the microphone 108 of the facsimile apparatus 101 via the radio channel, an input path to the ADPCM codec 203 is switched from a contact 215*a* to a contact 215*b* by the switch 215, and in order to supply audio data of a received audio ADPCM code to the speaker 107 of the facsimile apparatus 101, the switch 216 changes its contact from a contact 216*a* to a contact 216*b*. With these operations, the talking path is connected to the connector 213 via the communication apparatus I/F unit 212.

Next, talking paths of the facsimile apparatus (BS) 101 are switched (Step S405). A signal from the connector 310 is input to the communication control unit 307 via the wireless telephone apparatus I/F unit 309. An audio input/output signal is switched to the line echo canceler side to cancel a line echo. An audio input/output signal to and from the speaker 107 and microphone 108 of the facsimile apparatus 101 is switched to the acoustic echo canceler side. The connection to the two echo cancelers may be switched upon generation of an echo.

After the talking paths of the wireless telephone apparatus 103 and facsimile apparatus 101 are switched at Steps S404 and S405, hands-free (HF) talking becomes possible at the facsimile apparatus 101 via the radio channel 104.

The wireless telephone apparatus 103 operates by using a power supplied from the facsimile apparatus 101 without using its battery 214 (Step S406). The communication apparatus I/F unit 212 switches between the battery (BAT) 214 and the power source of the facsimile apparatus 101, to thereby supply a power from the facsimile apparatus 101 to the wireless telephone apparatus 103 via the connectors 310 and 213. If the power source voltage of the facsimile apparatus 101 is higher than that of the battery 214 of the wireless telephone apparatus 103, the power is supplied from the facsimile apparatus 101 to the wireless telephone apparatus 103.

Thereafter, the wireless telephone apparatus 103 again checks the connection between the wireless telephone apparatus (PS) 103 and facsimile apparatus (BS) 101 (Step S407). If the connection is maintained, it is checked whether a disconnection of the radio channel is confirmed (Step S408). If not, the operations at Steps S406, S407 and S408 are repeated.

If the wireless telephone apparatus 103 judges at Step S408 that the radio channel was released or disconnected, an operation is executed to make the talking paths of the wireless telephone apparatus 103 take default paths (Step S409). Specifically, in order to transmit an audio signal from the microphone 106 via the radio channel, the input path to the ADPCM codec 203 is switched from the contact 215*b* to the contact 215*a* by the switch 215, and in order to output audio data of an ADPCM code received via the radio channel to the speaker 105, the switch 216 changes its contact from the contact 216*b* to the contact 216*a*. In this manner, the microphone 106 and speaker 105 are connected to the ADPCM codec 203.

Upon detection of a change of the talking paths of the wireless telephone apparatus 103 to the default paths, the wireless telephone apparatus 101 executes an operation of changing its talking paths to default paths (Step S410). Specifically, a connection of a signal from the connector 310 to the communication control unit 307 via the wireless telephone apparatus I/F unit 309 is released. The default paths for talking with the handset 311 via the public telephone line 308 are set for the usual talking operation.

For the hands-free talking via the public telephone line 308, an audio input/output signal to and from the communication control unit 307 via the public telephone line 308 is connected to the line echo canceler side, and an audio input/output signal to and from the speaker 107 and microphone 108 of the facsimile apparatus 101 is connected to the acoustic echo canceler, to thereby switch the talking paths. The connection to the two echo cancelers may be switched upon generation of an echo. With the above operations, the hands-free talking becomes possible.

In order to detect that the wireless telephone apparatus 103 sets the talking paths to the default paths, whether an audio signal is not input via the connector 310 may be detected or the digital I/F unit may inform setting of the default paths after the wireless telephone apparatus 103 has set the talking paths to the default paths at Step S409.

If the wireless telephone apparatus 103 is connected to the facsimile apparatus 101 although the radio channel 104 is not established, then a power of the facsimile apparatus 101 is supplied to a circuit for charging the battery 214 connected to the communication apparatus I/F unit 212 via the connector 310 of the facsimile apparatus 101 and the connector 213 of the wireless telephone apparatus 103, to charge the battery 214 (Step S411). Thereafter, the process returns to Step S401 whereat the wireless telephone apparatus 103 and facsimile apparatus 101 enter the standby state.

If a connection is not confirmed at Step S407 between the wireless telephone apparatus 103 and facsimile apparatus 101, then the wireless telephone apparatus 103 executes an operation of making the talking paths thereof take the default paths (Step S412). Specifically, in order to transmit an audio signal from the microphone 106 via the radio channel, the input path to the ADPCM codec 203 is switched from the contact 215*b* to the contact 215*a* by the switch 215, and in order to output audio data of an ADPCM code received via the radio channel to the speaker 105, the switch 216 changes its contact from the contact 216*b* to the contact 216*a*. In this manner, the microphone 106 and speaker 105 are connected to the ADPCM codec 203.

Upon detection of a change of the talking paths of the wireless telephone apparatus 103 to the default paths, the facsimile apparatus 101 also executes an operation of changing its talking paths to the default paths (Step S413). Specifically, as described previously, a connection of a signal from the connector 310 to the communication control unit 307 via the wireless telephone apparatus I/F unit 309 is released. The default paths for talking with the handset 311 via the public telephone line 308 are set for the usual talking operation.

For the hands-free talking via the public telephone line 308, an audio input/output signal to and from the communication control unit 307 via the public telephone line 308 is connected to the line echo canceler side, and an audio input/output signal to and from the speaker 107 and microphone 108 of the facsimile apparatus 101 is connected to the acoustic echo canceler, to thereby switch the talking paths. The connection to the two echo cancelers may be switched upon generation of an echo. With the above operations, the hands-free talking becomes possible.

The wireless telephone apparatus 103 can enter thereafter the usual talking state and can continue talking via the radio channel 104 by itself (Step S414). The facsimile apparatus 101 resumes the standby state.

As described above, the portable wireless telephone apparatus 103 of this embodiment has the talking function for wireless talking via the radio channel 104, and operates as the wireless adapter of the facsimile apparatus 101 when connected to the facsimile apparatus 101 or communication apparatus.

While the facsimile apparatus 101 is connected to the wireless telephone apparatus 103 and executes wireless talking via the radio channel 104, the wireless telephone apparatus 103 is used as the wireless adapter for wireless talking via the radio channel. Therefore, the hands-free talking becomes possible by using the microphone 108 and speaker 107 for input/output audio signals supplied via the radio channel.

If the wireless telephone apparatus 103 is connected to the facsimile apparatus 101 during talking, the hands-free talking becomes possible by using the microphone 108 and speaker 107 of the facsimile apparatus 101 and the echo cancelers. It is possible to automatically detect that the wireless telephone apparatus 103 is connected to the facsimile apparatus 101. It is also possible to supply a power from the wireless telephone apparatus 103 to the facsimile apparatus 101.

In this embodiment, although the facsimile apparatus having the hands-free talking function has been described, other apparatus may also be used if they have the hands-free talking function. For example, a hands-free talking apparatus may be realized by providing an information terminal apparatus such as a personal computer with hardware having the hands-free talking function and application software having the hands-free talking function. A simple telephone apparatus having the hands-free function may also be used.

In this embodiment, the hands-free talking is performed by using the microphone 108 and speaker 107 of the facsimile apparatus. The microphone and speaker of the handset 311 may be used for the hands-free talking even during wireless talking via the radio channel.

It is obvious that the invention is also applicable to a system or apparatus by supplying programs thereto. In this case, the system or apparatus can enjoy the advantageous effects of the invention by reading software programs realizing the invention from a storage medium.

Figure 5A:
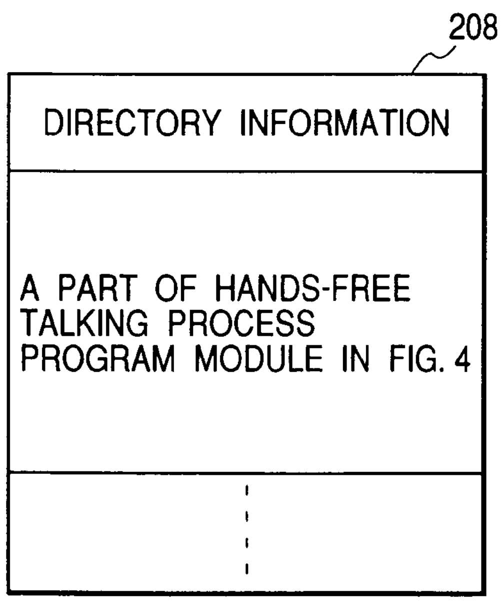
FIGS. 5A and 5B are memory maps of a ROM 208 and a ROM 302 as storage media.
Figure 5B:
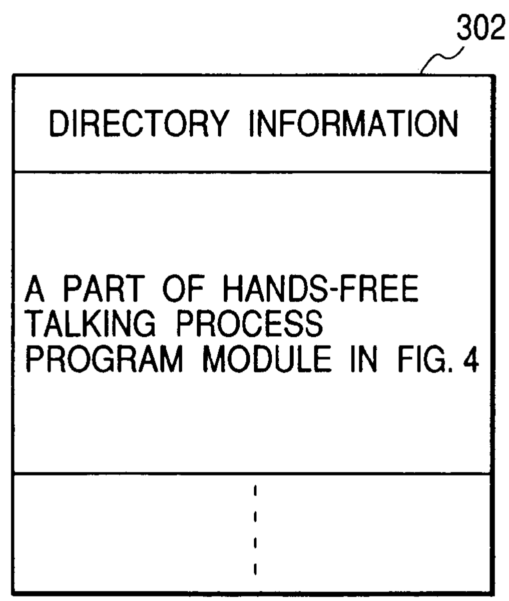

FIGS. 5A and 5B are memory maps of ROM 208 and ROM 302 as storage media. ROM 208 stores a hands-free talking process program module to be executed by CPU 207 of the wireless telephone apparatus 103, the program realizing a part of the operation illustrated in the flow chart of FIG. 4. Similarly, ROM 302 stores a hands-free talking process program module to be executed by CPU 301 of the facsimile apparatus 101, the program realizing a part of the operation illustrated in the flow chart of FIG. 4.

The program modules are stored in corresponding ones of ROM 208 of the wireless telephone apparatus 103 and ROM 302 of the facsimile apparatus 101, and executed by corresponding ones of CPU 207 and CPU 301. Instead, the program modules may be stored only in ROM 208 of the wireless telephone apparatus 103. In this case, when the wireless telephone apparatus 103 is connected to the facsimile apparatus 101, CPU 207 of the wireless telephone apparatus 103 transfers the program module to the CPU 301 of the facsimile apparatus 101 when necessary.

The storage medium storing the program module is not limited only to ROM, but other storage media may be used such as a floppy disk, a hard disk, an optical disk, a magnetooptical disk, a CD-ROM, a CD-R, a DVD, a magnetic tape, and a nonvolatile memory card.

As described so far, according to the present invention, the wireless telephone apparatus can be made compact and can facilitate outdoor use. In an indoor circumstance, hands-free talking of a good quality can be realized by using a communication apparatus such as a facsimile. A wireless telephone apparatus easier to use can be realized matching a use circumstance.

The wireless telephone apparatus has the talking function when it is connected at an indoor or outdoor to a public telephone line or a dedicated radio channel, and operates when it is connected to a communication apparatus. The communication apparatus performs wireless talking such as hands-free talking via a radio channel when it is connected to the wireless telephone apparatus. During the hands-free talking, a power consumption of the wireless telephone apparatus can be suppressed.

Communication via a base station is possible without degrading the merits of a wireless telephone apparatus. If the wireless telephone apparatus is connected to a communication apparatus such as a facsimile apparatus, then a talking means, a power supply circuit and echo cancelers respectively built in the facsimile apparatus can be used for communication.

What is claimed is:

1. A communication system having a first communication apparatus capable of a first speech communication via a first communication line and a second communication apparatus capable of a second speech communication via the first communication line or a second communication line, comprising:

a first speech device provided for the first communication apparatus for performing the first speech communication;

a handset speech device provided for the second communication apparatus for performing the second speech communication;

a hands-free speech device provided for the second communication apparatus for performing the second speech communication;

a first detecting device for detecting a connection between the first communication apparatus and the second communication apparatus;

a second detecting device for detecting a connection status of the first communication line; and a switching device for switching a speech communication from the first speech communication via the first communication line by said first speech device to the second speech communication via the first communication line by said hands-free speech device, in accordance with detecting by said first detecting device and said second detecting device, wherein the speech communication over the first communication line is maintained even if there is a switch between the first speech communication by said first speech device and the second speech communication by said hands-free speech device.

2. A communication system according to claim 1, wherein said first detecting device detects connection based on an electrical connection status.

3. A communication system according to claim 1, wherein said first detecting device detects connection based on a physical connection status.

4. A communication system according to claim 1, wherein, in the case that the first and second communication apparatuses are disconnected with each other while the second speech communication via the first communication line by the hands-free speech device is performed, said switching device switches from the second speech communication via the first communication line by the hands-free speech device to the first speech communication via the first communication line by the first speech device.

5. A communication system according to claim 1, further comprising a supply device for supplying a power from the second communication apparatus to the first communication apparatus, in accordance with the connection status between the first and second communication apparatus.

6. A communication system according to claim 5, wherein said supply device charges a battery of the first communication apparatus while the first communication apparatus does not perform speech communication.

7. A communication system according to claim 1, further comprising an echo canceller provided for the second communication apparatus, said echo canceller being used for the second communication via the second communication line, wherein the second speech communication via the first communication line by said second hands-free speech device is performed via said echo canceller.

8. A control method for a communication system having a first communication apparatus capable of a first speech communication via a first communication line and a second communication apparatus capable of a second speech communication via the first communication line or a second communication line, the first communication apparatus having a first speech device for performing the first speech communication, and the second communication apparatus having a handset speech device and a hands-free speech device for performing the second speech communication, the method comprising:

a first detecting step of detecting a connection between the first and second communication apparatus;

a second detecting step of detecting a connection status of the first communication line; and a switching step of switching the first speech communication via the first communication line by said first speech device to the second speech communication via the first communication line by said hands-free speech device, in accordance with detecting in said first detecting step and said second detecting step, wherein the speech communication over the first communication line is maintained even if there is a switch between the first speech communication by said first device and the second speech communication by said hands-free speech device.

* * * * *

UNITED STATES PATENT AND TRADEMARK OFFICE

CERTIFICATE OF CORRECTION

PATENT NO. : 6,968,207 B1

APPLICATION NO. : 09/694037

DATED : November 22, 2005

INVENTOR(S) : Yosuke Ezumi et al.

It is certified that error appears in the above-identified patent and that said Letters Patent is hereby corrected as shown below:

COLUMN 1:
Line 18, “telephones more than one.” should read -- more than one telephone.--.

COLUMN 9:
Line 31 and 34, “connection” should read -- the connection --.

Signed and Sealed this

Nineteenth Day of December, 2006

JON W. DUDAS

*Director of the United States Patent and Trademark Office*